United States Patent Office 3,282,941
Patented Nov. 1, 1966

3,282,941
CHLORO-QUINOXALINE-DICARBOXYLIC ANHYDRIDES
Yu-Wei Chang, Wilmington, Del., assignor to E. I. du Pont de Nemours and Company, Wilmington, Del., a corporation of Delaware
No Drawing. Filed Dec. 5, 1962, Ser. No. 242,351
3 Claims. (Cl. 260—250)

This invention is directed to a novel process for the production of chloroquinoxalinecarbonyl chlorides and novel chloroquinoxalinecarboxylic acid anhydrides by the reaction of hydroxyquinoxaline carboxylic acids with phosgene in the presence of a substituted carboxamide.

Heretofore, $PCl_5$ has been used as the chlorinating agent to form chloroquinoxalinecarbonyl chlorides from hydroxyquinoxalinecarboxylic acids. Fair yields (40–70%) are obtained with $PCl_5$ or $POCl_3$ and the product must be isolated from phosphorus by-products by drowning in ice water, which step promotes the hydrolysis of the product. These features contribute to an uneconomical process when practiced on a commercial scale.

It has been discovered that unexpected high yields (85–97%) are obtained when hydroxyquinoxalinecarboxylic acids are chlorinated with phosgene in the presence of a carboxamide as a catalyst in an inert organic solvent. The advantages of such a process, in addition to the high yields, are (1) the absence of a by-product which must be separated (since $CO_2$ and HCl, the by-products of the reaction, are liberated as vapors in the course of the reaction, their removal presents no problems), and (2) the resulting chloroquinoxalinecarbonyl chloride formed in the inert organic solvent may be used for further conversions "in situ" without isolation. This is especially advantageous since the products of this novel process are used in the manufacture of dyes, as in British Patent No. 315,451. The steps of isolation and purification of the chloroquinoxalinecarbonyl chloride as well as subsequent dissolution, which are important economic factors, are eliminated.

It is, therefore, an object of this invention to provide a novel process for the preparation of chloroquinoxalinecarbonyl chlorides, in high yields. Another object is to provide a novel class of said anhydrides.

It is a further object to provide a low cost, economical process readily adaptable to large scale manufacture.

These and other objects will be apparent in the specification, examples and claims which follow.

More specifically, the present invention is directed to a process for the preparation of chloroquinoxalinecarbonyl chlorides and chloroquinoxalinecarboxylic acid anhydrides, said anhydrides representing a novel class of compounds, which process comprises reacting a hydroxyquinoxalinecarboxylic acid in an inert organic solvent with phosgene at 80° to 150° C. in the presence of a catalytic amount of a carboxamide and clarifying the solution.

The process of this invention may be applied to hydroxyquinoxalinecarboxylic acids of the formula:

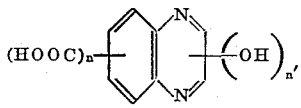

wherein n and n' are 1 or 2 and may be alike or different. Illustrative examples of said acids include:

(a) 2,3-dihydroxy-6-quinoxalinecarboxylic acid
(b) 2-hydroxy-6-quinoxalinecarboxylic acid
(c) 2-hydroxy-7-quinoxalinecarboxylic acid
(d) 2,3-dihydroxy-5-quinoxalinecarboxylic acid
(e) 2-hydroxy-5-quinoxalinecarboxylic acid
(f) 2-hydroxy-8-quinoxalinecarboxylic acid
(g) 2,3-dihydroxy-6,7-quinoxalinedicarboxylic acid
(h) 2-hydroxy-6,7-quinoxalinedicarboxylic acid Also, the present novel process may be utilized to produce the novel chloroquinoxalinecarboxylic acid anhydrides having the formula:

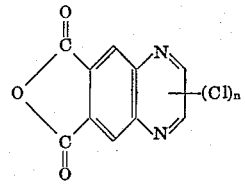

wherein n is 1 or 2.

Ilustrative examples of said anhydrides include:

(a) 2,3-dichloro-6,7-quinoxalinedicarboxylic acid anhydride
(b) 2-chloro-6,7-quinoxalinedicarboxylic acid anhydride.

The hydroxyquinoxalinecarboxylic acid starting material is suspended in an inert organic solvent. A catalytic amount of the carboxamide is added and the mixture is heated to the reaction temperature with agitation. Phosgene is introduced into the mixture until a slight excess over the theoretical amount has been added, or a clear solution results. The solution is then decanted or filtered from a slight, brown residue which may form and the dissolved product may be used for further reaction as such or the solvent may be vacuum distilled leaving a product which when cooled becomes a colorless or slightly colored solid.

The solvent utilized in the practice of this invention is is an inert organic liquid which is a solvent for the product and boils in the range of 80° C. to 250° C., preferably 100° to 250° C. If the boiling point of the solvent is below 80° C., the temperature required for rapid reaction is not attained. If the boiling point is above 250° C., it will be difficult to remove the solvent at the end of the reaction. The amount of solvent used is about 2 to 10 parts of solvent per one part of starting material, preferably 5 to 3 parts of solvent are used. If the amount of solvent is reduced too much, it becomes difficult to clarify the resulting solution of the product. On the other hand, excessive quantities of solvent cut down the charge size and extend the work-up procedure.

Representative examples of solvents include benzene, chlorobenzene, o-dichlorobenzene, toluene, o-, m-, or p-xylene, ethyl acetate and p-chlorotoluene.

Reaction temperatures which may be utilized range from 80° to 150° C., preferably 100° to 130° C. If below 80° C., the reaction is slow. Above 150° C., the yield decreases.

At least the theoretical amount of phosgene is necessary, which amount is one mole of phosgene for each hydroxyl and each carboxylic acid group present in the respective starting materials. However, a slight excess is desirable, about 10% to 50%; amounts above 50% are unnecessary and wasteful.

The carboxamide catalyst which may be utilized is a compound of the formula:

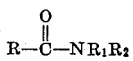

where R is hydrogen, alkyl or aryl, $R_1$ is alkyl, $R^2$ is alkyl or aryl 1, R and $R_2$ taken together with the

group form a heterocyclic ring containing 3 to 6 ring carbon atoms and a nuclear nitrogen atom, or $R_1$ and $R_2$ taken together form a heterocyclic ring.

The following are representative examples of carboxamides which are economically advantageous for large scale manufacture according to the process of this invention:

N,N-dimethylacetamide
N,N-dimethylformamide
N,N-diethylacetamide
N,N-di-n-propylacetamide
N,N-diisopropylacetamide
N-acetylpyrrole
N,N-di-n-butylformamide
N,N-dimethylpropionamide
N-methyl-N-phenylformamide
N,N-diethylpropionamide
N,N-diisopropylpropionamide
N,N-dimethylbutyramide
N,N-diethylbutyramide
N,N-dimethyltrimethylacetamide
N,N-diethyltrimethylacetamide
N,N-dimethylisovaleramide
N,β-dimethylpropiolactam
N-ethyl-β-methylpropiolactam
N-methyl-2-pyrrolidone
N-ethyl-2-pyrrolidone
N-isopropyl-2-pyrrolidone
1,5-dimethyl-2-pyrrolidone
1,3,3,5-tetramethyl-2-pyrrolidone
N-methyl-2-piperidone
N-ethyl-2-piperidone
and N-methyl-ε-caprolactam The amount of catalyst used in this process varies from about 1 mole of catalyst per 4 to 20 moles of starting material, preferably 1 mole of catalyst per 5–15 moles of hydroxyquinoxalinecarboxylic acid. Under 1 mole of catalyst per 20 mole of starting material, the reaction is slower and results in the inefficient use of phosgene. When less than 4 moles of starting material per mole of catalyst are used, the yield is lower and the process is commercially impractical.

Representative examples illustrating this novel process of this invention follow.

Example I 80 parts of 2,3-dihydroxy-6-quinoxalinecarboxylic acid (prepared by the condensation of 3,4-diaminobenzoic and oxalic acid ethyl ester as in British Patent 315,451) are slurried with 4 parts of dimethylformamide in 240 parts of p-xylene and heated to 110° C. At this temperature, 120° C.±10° C., are added over a 5-hour period, or until a clear solution results, 125 parts of phosgene. The clear solution is clarified of the resulting brown tar and the solvent then distilled under vacuum at 120° C., leaving a light brown oil which is cast into pans, cooled and ground. There results 97 parts of 2,3-dichloro-6-quinoxalinecarbonyl chloride a tan powder, M.P. 111–113° C.

Analysis.—Calcd. for $C_9H_3ON_2Cl_3$: C, 41.4; H, 1.16; N, 10.8; Cl, 40.7. Found: C, 42.1; H, 1.5; N, 10.8; Cl, 39.1.

Example II 20 parts of 2-hydroxy-7-quinoxalinecarboxylic acid (prepared as the only isomer from the reaction of 3,4-diaminobenzoic acid sodium salt in aqueous ethanol with n-butyl glyoxalate) are suspended in 210 parts of ethyl acetate and 1.5 parts of dimethyl formamide and heated to reflux. At this temperature, phosgene is passed through the slurry to give a clear solution containing a black tar on the sides of the container. This in a typical run requires 32 parts of phosgene and 4 hours. The solution is then decanted from the tar and evaporated under reduced pressure. After cooling, there results 21.5 parts of a cream-colored solid, M.P. 120–122° C., which has the 2-chloro-7-quinoxalinecarbonyl chloride structure.

Analysis.—Calcd. for $C_9H_4ON_2Cl_2$: C, 47.6; H, 1.78; N, 12.34; Cl, 31.2. Found: C, 48.2; H, 2.0; N, 12.4; Cl, 30.3.

When one uses 2-hydroxy-6-quinoxalinecarboxylic acid in the preceding example, the 2-chloro-6-quinoxalinecarbonyl chloride M.P. 127°–129° C., is produced.

Example III 20 parts of the 2,3-dihydroxy-6,7-quinoxalinedicarboxylic acid are slurried in 105 parts of monochlorobenzene and 1 part of dimethylformamide. Into this slurry is passed phosgene while the temperature is raised to 125°±5° C. and held at this temperature until a clear solution results. A typical reaction requires 2 hours at 125°±5° C. and 39 parts of phosgene. The solution, after being decanted away from the tar-like residue and cooled to room temperature, deposits crystals which are filtered and dried below 60° C. in vacuum to produce 18.9 parts of colorless crystals, M.P. 284–286° C., of 2,3-dichloro-6,7-quinoxalinecarboxylic acid anhydride.

Analysis.—Calcd. for $C_{10}H_2O_3N_2Cl_2$: C, 44.7; H, 0.75; N, 10.4; Cl, 26.3. Found: C, 44.8; H, 0.75; N, 10.3; Cl, 26.5.

When one uses an equimolar amount of 2-hydroxy-6,7-quinoxalinedicarboxylic acid in this example in place of the 2,3-dihydroxy-6,7-quinoxalinedicarboxylic acid, 2-chloro-6,7-quinoxalinedicarboxylic acid anhydride is produced.

Example IV 80 parts of 2,3-dihydroxy-6-quinoxalinecarboxylic acid (prepared as in Example I) are suspended in 310 parts of o-dichlorobenzene and 4 parts of N-methyl-ε-caprolactam and heated to 80° C. 131 parts of phosgene are passed into this slurry at 80–120° C. over a 3-hour period to afford a clear solution containing a trace of black tar. Upon clarification, evaporation and casting as in Example I, there results 93 parts of 2,3-dichloro-6-quinoxalinecarbonyl chloride, a yellow solid, M.P. 112–113° C., whose infrared spectrum is identical in every detail with the spectrum of the material isolated from Example I.

Example V 20 parts of 2,3-dihydroxy-5-quinoxalinecarboxylic acid (prepared from 2,3-diaminobenzoic acid and diethyl oxalate in ethyl alcohol) are suspended in 80 parts of monochlorobenzene and 2 parts of N-methyl-2-piperidone. The resulting slurry is heated to 125°±5° C. after which, over a 2-hour period, are added 35 parts of phosgene to afford a clear solution containing small amounts of black tar. Clarification and removal of the solvent under reduced pressures affords 23.2 parts of a brown solid, M.P. 113–115° C., having the 2,3-dichloro-5-quinoxalinecarbonyl chloride structure.

Analysis.—Calcd. for $C_9H_3ON_2Cl_3$: Cl, 40.7. Found: Cl, 40.1.

Substitution of an equal molar amount of 2-hydroxy-5-quinoxalinecarbonoxylic acid in place of the 2,3-di-hydroxy-5-quinoxalinecarboxylic acid in Example V yields 2-chloro-5-quinoxalinecarbonyl chloride. The substitution of 2-hydroxy-8-quinoxalinecarboxylic acid produces 2-chloro-8-quinoxalinecarbonyl chloride.

Example VI 20 parts of 2,3-dihydroxy-6-quinoxalinecarboxylic acid prepared as in Example I are suspended in 80 parts of mixed xylene and 0.6 part of dimethylacetamide at 120°±10° C. There is added over a 3-hour period 37 parts of phosgene to afford a clear solution containing traces of black tar. Clarification and evaporation of the solvent affords 20.4 parts of 2,3-dichloro-6-quinoxalinecarbonyl chloride, a cream-colored solid, M.P. 109–112° C., whose infrared spectrum is identical with that of the material prepared in Example I.

The chloroquinoxalinecarbonyl chlorides and novel chloroquinoxalinecarboxylic acid anhydrides produced according to the present invention may be readily utilized by one skilled in the art to prepare fiber reactive dyes; dyes of this type have in their chemical structure a dye chromophore and at least one chemical group which will react with a hydroxyl or an amino group in a textile material, thus chemically bonding the dye to the fiber. Two of the newest classes of fiber-reactive dyes use as their reactive chemical group chloroquinoxalines and dichlorophthalazine radicals. The radicals are most frequently attached to a dye chromophore through a carbonyl amino group as follows:

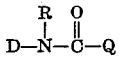

where D is the dye chromophore, R is hydrogen or lower alkyl and Q is either a chloroquinoxaline radical or the dichlorophthalazine radical. Fiber-reactive dyes of the preceding general formula where said D is a phthalocyanine chromophore are known. Such dyes afford the highly desirable turquoise shades often observed in wearing apparel. The chloroquinoxaline carbonyl chlorides and chloroquinoxalinecarboxylic acid anhydrides may be utilized in the preparation of dyes as suggested by French Patents 658,763 and 1,193,734. These compounds may also be utilized to prepare pharamaceuticals (antibiotic) as suggested in J. Weyland et al., J. Am. Chem. Soc. 66, 1957 (1944) and K. Phiske III et al., J. Am. Chem. Soc. 73, 4955 (1951).

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula:

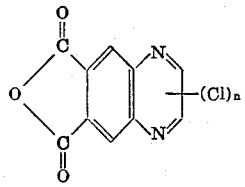

wherein $n$ is the integer 1 to 2.

2. 2,3-dichloro-6,7-quinoxalinedicarboxylic acid anhydride.

3. 2-chloro-6,7-quinoxalinedicarboxylic acid anhydride.

References Cited by the Examiner

UNITED STATES PATENTS 2,154,889  4/1939  Braun et al. _____ 260—251

FOREIGN PATENTS 29,669  11/1884  Germany.
851,684  10/1960  Great Britain.
1,193,734  11/1959  France.

OTHER REFERENCES

Chattaway et al., J. Chem. Soc., London (1929) pages 645–51.

Dyson, Chemical Reviews, vol. 4, No. 1 (May 1927) at page 155.

ALEX MAZEL, *Primary Examiner.*

NICHOLAS S. RIZZO, HENRY R. JILES,
*Assistant Examiners.*